No. 891,816. PATENTED JUNE 30, 1908.
A. W. COPLAND.
OVEN FEEDING DEVICE.
APPLICATION FILED JAN. 31, 1902.
2 SHEETS—SHEET 1.
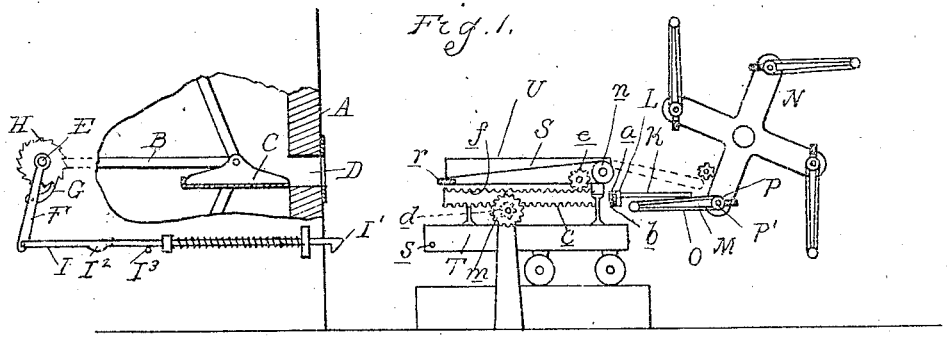
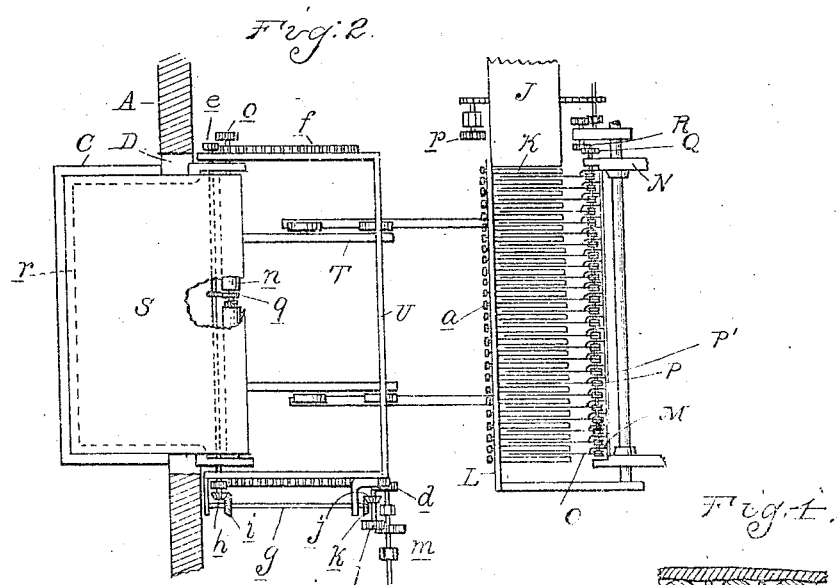
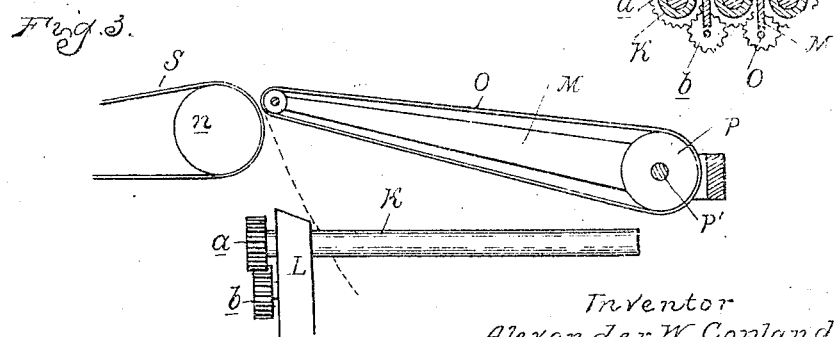
Inventor
Alexander W. Copland

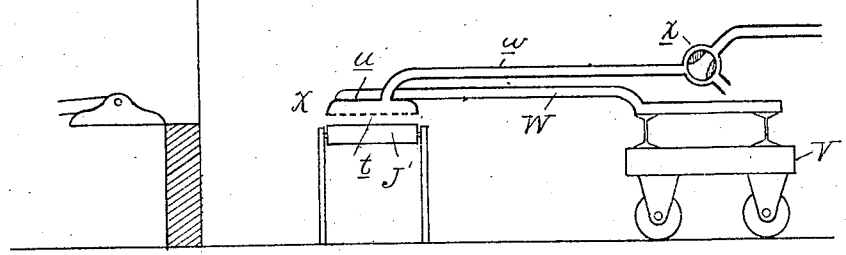
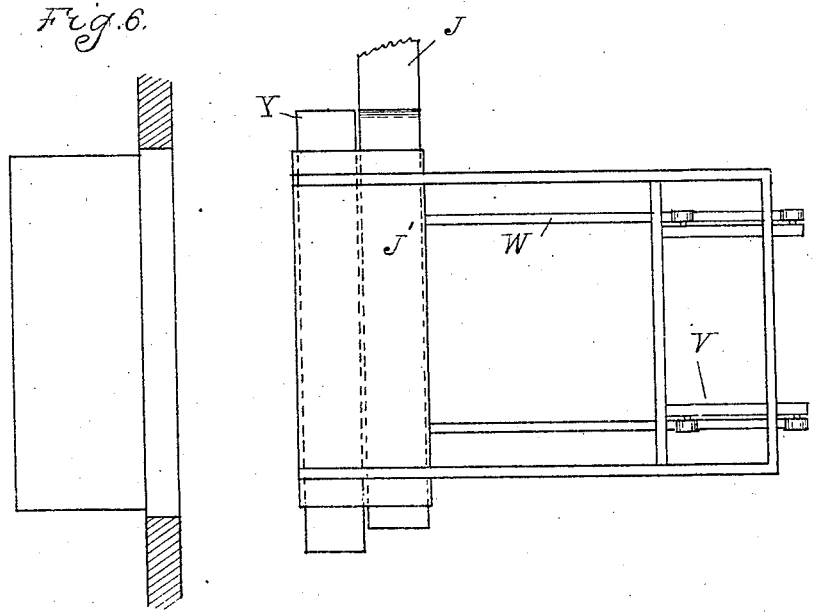

UNITED STATES PATENT OFFICE.

ALEXANDER W. COPLAND, OF DETROIT, MICHIGAN.

OVEN-FEEDING DEVICE.

No. 891,816.    Specification of Letters Patent.    Patented June 30, 1908.

Application filed January 31, 1902. Serial No. 92,007.

*To all whom it may concern:*

Be it known that I, ALEXANDER W. COPLAND, residing at Detroit, in the county of Wayne and State of Michigan, a citizen of the United States, have invented certain new and useful Improvements in Oven-Feeding Devices, of which the following is a specification, reference being had therein to the accompanying drawings.

The invention relates to mechanism for automatically feeding cut dough into baking ovens, being especially designed for use in the manufacture of crackers and small cakes.

The mechanism is especially applicable to that type of ovens in which the dough during the time of baking is supported upon a rotary carrier or reel having a plurality of pans which are periodically registered with the oven opening so that the cooked product may be removed and a fresh charge of dough placed thereon. In its broader features however the invention is applicable to other types of oven.

In the present state of the art it has been the usual practice to feed ovens of the type above referred to by hand. This requires the attention of a number of workmen who whenever the pan of the carrier is brought in registration with the oven opening and the cooked product removed therefrom, recharge said pan by successively depositing sections of the cut dough thereon. The sections of dough are conveyed from the cutting machine to the oven pan upon a shovel or "peel" and are deposited on the latter by a quick withdrawal of the peel so as to slide it from beneath the dough; an operation requiring considerable skill on the part of the workman. After a full charge has been placed upon the pan the reel is rotated sufficiently to bring another pan into registration with the oven opening and this operation is also usually controlled by hand.

It is the object of the present invention to provide mechanical devices to automatically perform all the operations above described, viz., the periodic feeding of the cut dough into the oven, the "peeling" of it upon the pan of the oven carrier, and the subsequent rotation of said oven carrier or reel to bring another pan into registration with the oven opening.

It is a further object to adapt this mechanism to receive all of the cut dough as fast as delivered from the cutter; to arrange the cut dough in proper form for a charge and to automatically insert and "peel" said charge, the latter operation being accomplished during the interval in which a succeeding charge is being accumulated.

At the present time the dough for crackers and small cakes is usually cut by machines which are continuous in their operation and deliver the cut product in a constantly moving column. The width of this column is not however usually as great as the width or smaller dimension of the baking pan, and is of course of much lesser width than the greater dimension or length of said pan. This necessitates that the cooked dough before being delivered into the oven shall first be arranged into a charge having dimensions corresponding to those of the pan.

The invention consists in the means employed for automatically feeding and delivering the charge of cut dough into the oven. Further in the means for accumulating the dough from a constantly operating cutter into charges corresponding to the sizes of the baking pans. Further in the means whereby one charge is delivered upon the pan during the interval in which the succeeding charge is accumulated. Further in means for shifting the oven carrier during the interval between the delivery of succeeding charges. Further in the mechanism employed for "peeling" the charge upon the oven carrier pan and further in certain features of construction as will be more fully hereinafter described and claimed.

In the drawings, Figure 1 is a diagrammatic elevation of one construction of my mechanical feeder specially illustrating the oven feeding mechanism for the dough together with coöperating mechanism for shifting the oven carrier. Fig. 2 is a plan view showing the mechanism for receiving the cut dough from the cutting machine and accumulating it into charges. Fig. 3 is a sectional elevation of a portion of the charge accumulating mechanism. Fig. 4 is a cross section of the same. Fig. 5 is a diagrammatic elevation of a modified construction. Fig. 6 is a diagrammatic plan thereof.

In describing my mechanical feed I shall make use wherever possible of terms corresponding to those used in the trade to describe the hand operation. Thus the mechanism for removing the sheet or column of cut dough from the carrier which delivers it from the cutter I shall term the "stripper". Again the operation of delivering the charge of cut dough upon the pan of the oven carrier I shall call the "peel". I shall however make use of the broader terms "oven feed" "transfer carrier" and "dough feeding mechanism," in describing broad operation.

In construction shown in Figs. 1 to 4, A is the oven, B the carrier or reel, and C the baking pans or shelves which are swung from arms of the reel and are adapted in the rotation of the latter to be successively brought into registration with the oven opening D.

E is a shaft upon which the reel is mounted which passes out through the wall of the oven and is connected with mechanism for periodically rotating it to bring a new pan into registration with the opening D. The exact construction of this shifting mechanism I do not consider an essential part of the present invention and I have therefore merely indicated it diagrammatically as comprising a rock arm F carrying the pawl G and a ratchet wheel H upon the shaft E with which said pawl is adapted to engage so as to rotate the reel by the movement of the rock arm. The rock arm is shown as connected with a pull rod I which passes to the front of the oven and is provided with a hook I' adapted to be periodically engaged with the operating device hereinafter to be described.

J is a feed apron for a sheet of cut dough from a cutter (not shown). This cutter may be of any suitable construction but preferably one which is adapted to operate continuously so as to deliver an uninterrupted supply of cut dough such for instance as a reciprocating or a rotary cutter. Adjacent to this apron is arranged the stripper adapted to receive a section of the cut product and then to transfer it to the oven feeding carrier. As shown in Figs. 1 to 4 this stripper comprises a series of small rolls K slightly spaced from each other and together forming a roller bed extending from the end of the cutter carrier. These rolls are journaled at one end in bearings L and are driven at the same peripheral speed by gears $a$ on each roll and intermediate gears $b$.

M are fingers secured to a common rotary head N and adapted in the rotation of said head to pass between the rolls K. Each of the fingers M has secured thereto a belt or endless carrier O which is limited in width to pass between the rolls K. The belts O pass over pulleys P at one end which are secured to a common shaft P' journaled in the rotary head N. At one end of this shaft is a gear wheel Q adapted in one position of the head N to come into mesh with the drive gear R journaled in stationary bearings, and thus to be driven thereby and to cause the driving of each of the belts O. The rotary head N is preferably provided with a number of arms each of which is provided with a series of fingers M and belts O and these arms in the rotation of the head will successively pass their fingers between the rolls K. On the opposite side of the rolls K from that on which the rotary head N is placed is arranged the oven carrier S.

The parts just described are so arranged that in operation the cut dough fed on the feed apron J will pass on the rolls K and be fed thereover at the same speed as it is delivered from the cutter. Just before reaching the end of the series of rolls K the head N will be rotated sufficiently to pass one series of fingers M upward between the rolls so as to lift the cut product therefrom and to carry it upward. The movement of the head N is arrested when the outer ends of the fingers M come into adjacence with the end of the oven carrier S, which latter is preferably in the form of an endless belt or apron which is periodically rotated. The mechanism for driving the apron S is so timed that the movement will be imparted to the apron whenever the fingers M are in adjacence thereto. The drive gear R is also positioned so that when the fingers are in the position above stated the gear Q will come into mesh with the gear R thereby causing all of the belts O to be driven. As shown in Fig. 1 the level of the roller bed is below that of the carrier S and thus when the movement of the fingers M is arrested they will be sufficiently above the bed formed by the rolls K to permit of the feeding of another section of cut dough thereon. From the description as thus far given it will be understood that sections of cut dough will be periodically lifted from off the roller bed by the fingers M and then fed by the rotation of the belts O from off said fingers on the carrier S.

The carrier S is preferably adapted to receive a plurality of sections of the cut dough which are successively fed thereon and placed adjacent to each other. Thus if the width of the feed apron J for the cut dough is less than the width of the pan C a sufficient number of sections are placed upon the carrier S to make a charge of the required width.

The carrier S is provided with mechanism for periodically moving it into and out from the oven. As shown the carrier is supported upon the traveling carriage T which in its normal position will hold said carrier in position to receive the cut dough from the transfer. Whenever the carriage is moved inward towards the oven the carrier will be brought into a position adjacent to the opening D. The further movement of the carrier into the oven is provided for by mounting it upon the frame U which is slidingly secured to the carriage frame T and is adapted when the latter has reached the limit of its inward movement to be slid thereon until it comes into registration with the pan C.

Any suitable mechanism may be employed for causing the traveling of the carriage T and the frame U thereon but as shown this comprises a rack $c$ on the carriage frame which meshes with a pinion $d$ journaled in stationary bearings. The frame U has secured thereto a pinion $e$ which meshes with racks $f$ on the carriage frame and on which they are adapted to travel. The pinions $e$ are secured to a common shaft which is driven from a shaft $g$ at right angles thereto secured to the carriage frame by means of intermeshing bevel gears $h$ and $i$ both being journaled in the frame U and the latter being splined to the shaft $g$ so as to travel longitudinally thereon. The shaft $g$ is connected by bevel gears $j$ and $k$ with a gear wheel $l$ and the latter is arranged in the same vertical plane as the gear wheel $m$. This gear wheel is so positioned that when the carriage T is moved to the limit of its inward movement the gear wheel $l$ will come into mesh with the gear wheel $m$ and cause the rotation of the shaft $g$ which through the bevel gears $h$ and $i$ will drive the pinion $e$ and cause the latter to travel along the rack $f$. This movement will cause the traveling of the frame U in its sliding bearings until the carrier S comes into registration with the pan.

As before stated the carrier S is preferably adapted to receive a plurality of sections of the cut product before it is fed inward to the oven. In order that it may receive these sections the carrier apron is driven by the roll $n$ which has connected thereto the gear wheel $o$ and the latter is in mesh with the gear wheel $p$ journaled in stationary bearings, whenever the carrier S is in its normal or retracted position. The gear wheel $p$ is timed to move synchronously with the movement of the belts O upon the fingers M and thus the carrier S is caused to travel at the same speed as the belts O during the transfer. As soon however as one section of the product is transferred to the apron S the movement of the gear wheel $p$ is arrested and remains at rest until another section is to be transferred. Thus the two sections will be placed adjacent to each other upon the carrier apron S so as to form the charge.

After the frame U and carrier S have been projected into the oven the reversal of the drive mechanism will cause them to be again retracted, the frame U first moving outward and afterwards the carriage T traveling back to its initial position. This reverse movement is effected by a suitable trip mechanism controlling the movement of the gear wheels $d$ and $m$ and actuated by the final inward movement of the frame U. As the particular mechanism employed forms the subject matter of another application for patent which I am concurrently filing herewith I deem it unnecessary to further describe the same.

As the carrier S moves outward it is necessary that the charge thereon be peeled off therefrom and on to the pan C. This is accomplished by connecting the pinion $e$ to the roll $n$ through the medium of a ratchet connection $q$, the latter being so arranged that when the frame U is traveling inward the movement of the pinions will not be imparted to the roll but when said frame is moving outward the roll will be driven and the carrier S caused to travel inward at the same speed as the frame is moving outward. The inner end of the carrier S preferably passes around a thin bar $r$ so that the movement of the apron around this bar will cause the cut dough thereon to be deposited upon the pan as the frame U moves outward. The carriage frame T is provided with a shoulder or detent $s$ for engaging with the hook I'. This will cause the outward movement of the carriage to draw upon the rod I and rock the arm F and thereby cause the pawl G to rotate the ratchet wheel H and turn the reel, a cam $I^2$ and bearing $I^3$ serving to disengage the hook I' from the detent after this movement. Thus the pan upon which the charge has been deposited will thus be carried away from the oven opening D and another pan registered therewith. During the interval in which the carriage is stationary the attendant can remove the cooked product from the pan by raking it out or in any other suitable way.

In Figs. 5 and 6 I have shown a modification of my apparatus in which the greater part of the mechanism shown in the other figures is dispensed with and a pneumatic carrier is arranged for transferring the cut dough into the oven. As shown J' is an extension of the dough feeding apron which extends across the space in front of the oven opening. V is the carriage adapted to be reciprocated towards and from the oven; W are arms projecting from said carriage carrying at their free ends a pneumatic dough lifter X. The arrangement is such that in the outer position of the carriage V the pneumatic lifter X is arranged just above the carrier apron J' while in the inner position of the carriages V the lifter will be just above one of the shelves in the oven. The lifter X comprises a perforated plate or fabric $t$ which covers a hollow plate $u$ and the chamber within the latter is connected by a conduit $w$ with a suction device not shown. $x$ is a valve conduit adapted to be periodically opened to exhaust the air from the hollow plate $u$ or to close off the suction and to admit air at atmospheric pressure into said chamber.

With the device constructed as described whenever a section of cut dough has been fed upon the apron J' the valve x is opened to exhaust the air from the chamber within the hollow plate u which will cause the atmospheric pressure to lift the cut dough from the apron J' and hold it against the perforated plate t. The carriage V is then moved inward until the lifter X is above the oven pan after which the position of the valve x is reversed to admit air at atmospheric pressure into the hollow plate u, resulting in dropping the dough from the perforated plate onto the oven pan. If necessary the hollow plate u may be also connected by the valve x with a source of compressed air which will insure the detachment of all of the dough.

In Fig. 6 the arrangement is the same as in Fig. 5 with the additional feature that the section first lifted by the pneumatic lifter X is temporarily deposited upon a shelf Y in adjacence to the apron J' and in the succeeding operation is again lifted together with the second section both being carried into the oven and simultaneously deposited upon the pan. This latter construction permits of depositing the charge upon the oven pan which is of greater width than the column of cut dough from the cutter. It is of course necessary with this construction that the width of the pneumatic lifter be sufficient for it to lift both sections simultaneously. If desired the lifter may be made in two sections from which the air may be separately exhausted. This will permit of first lifting one section of the dough by the forward section of the lifter and of then registering the rear section of the lifter with the carrier and subsequently lifting off a second section of dough thereby. Both sections can then be moved into the oven and simultaneously deposited upon the pan.

What I claim as my invention is:

1. The combination with an oven having a lateral opening, of a delivery mechanism for delivering cut dough adjacent to the oven, and a reciprocating device for picking up and transferring the cut dough from the delivery mechanism through said opening into the oven.

2. The combination with an oven having an external constant delivery for cut dough and having a lateral opening, of reciprocating mechanism for periodically picking up an accumulated charge of dough from the delivery mechanism and delivering it through said opening into the oven.

3. The combination with an oven having a lateral opening of a device for feeding cut dough sections therein comprising a carrier, means movable transversely of the carrier for picking up the charge therefrom and moving and delivering the same transversely through said opening onto a receiver in the oven, such feeding device maintaining the arrangement of the dough sections undisturbed.

4. The combination with an oven having a lateral opening, of a feeding device for cut dough comprising a reciprocating carrier, means for picking up and supporting the charge thereon externally of the oven and delivering said charge through said opening within the oven.

5. In an oven feeding device, the combination of a carrier for a cut dough strip, means for transferring a multiple of sections of such strip and collecting them with the longitudinal edges of the section of the strip side by side to make a charge, and mechanism for intermittently transferring such charge into an oven.

6. The combination with an oven, of a carrier for feeding a series of cut dough sections adjacent to the oven, and means for gathering such dough sections from the carrier upon an oven feed carrier side by side, and means for causing said oven feed carrier to deliver the sections in a single charge into the oven.

7. In an oven feeding device, the combination of a reciprocating carrier adapted to feed the sections into an oven and withdraw therefrom, of a stripper for delivering the sections on said reciprocating carrier.

8. The combination of an oven feed carrier adapted to deliver a charge into the oven and withdraw therefrom, of a charge stripper adapted to feed a multiple of sections of the charge side by side thereon.

9. In an oven feeding device the combination of a stripper comprising a frame, a belt thereon, means for reciprocating the stripper in relation to a receiving device and for driving the belt during the feeding or return movement, to deliver the charge therefrom to the receiving device.

10. The combination with a reel oven having a lateral opening, of a carrier for bringing cut dough adjacent to said oven, and a reciprocating transfer device for delivering the cut dough through said opening into the oven, depositing it upon a shelf thereof, and withdrawing.

11. The combination with a reel oven having a lateral opening and a series of shelves or pans within, a carrier for bringing cut dough adjacent to the oven, and a reciprocating transfer device for taking the dough from the carrier and delivering it to a shelf or pan in the oven.

12. The combination with a rotary or traveling oven having a lateral opening, of a carrier for bringing the cut dough adjacent to said oven, of mechanism moving transversely relative to the carrier for lifting the cut dough from the top of said carrier and mechanism for delivering it through said opening to the oven.

13. The combination with a rotary or traveling oven having a lateral opening and having within pans or shelves, of a carrier for bringing the cut dough strip adjacent to the oven, and mechanism moving transversely relative to the carrier for feeding the dough in its flat strip form through said opening from the feed carrier and upon a pan or shelf in the oven.

14. The combination with a rotary or traveling oven having a lateral opening and having pans or shelves within, of a carrier for feeding a strip of cut dough adjacent to the oven and parallel to the axis of rotation thereof, and mechanism for transferring the cut dough in its flat strip form, transversely from the carrier through said opening and depositing it on a pan or shelf of the oven.

15. In an oven feeding device, the combination of a continuous feed device for a narrow sheet of cut dough, and means for separating sections from the sheet of greater length than width, and delivering them laterally from the sheet feed devices.

16. The combination with an oven having a lateral opening and a constant delivering dough feed device, of a reciprocating carrier for picking up and periodically transferring the accumulated cut dough through said opening into said opening and depositing it.

17. The combination with an oven having a lateral opening and having a baking pan or shelf therein, of a carrier for cut dough adapted to be reciprocated into and out of said oven through said opening, and means for peeling a charge of cut dough from said carrier onto said pan or shelf.

18. The combination with a dough delivery carrier and an oven having a baking pan or shelf therein, of a transfer carrier adapted to be reciprocated to and from said oven, means for stripping a charge of cut dough from said delivery carrier into engagement with said transfer carrier, while the latter is at the outer end of its movement and means for peeling said charge onto the oven shelf or pan when said transfer carrier is at the inner end of its movement.

19. The combination with an oven having a baking pan or shelf therein, of a carrier for cut dough comprising a flexible apron in the form of a loop upon the upper section of which the charge of cut dough is delivered, means for reciprocating said carrier to and from said oven, and means operating while said charge is above the oven pan for drawing the lower section of said loop outward to peel the charge from said apron section onto said pan.

20. The combination of an oven provided with a feed opening, an oven feed of substantially the width of said feed opening, means for conveying a narrow sheet of cut dough and means for delivering a section of said dough to said oven feed through said opening, the length of said section corresponding to the width of said oven feed.

21. In an oven feeding device, the combination of continually acting feed devices for delivering a cut dough strip to a charge stripper, and a charge stripper for receiving and holding the charge and delivering it intermittently to an oven feed device, and said oven feed device.

22. In a device for handling a cut dough strip, crackers and similar devices, the combination of a carrier, of a device for taking series of sections of cut dough or crackers from the carrier comprising mechanism moving transversely to the line of travel of the carrier, adapted to bodily lift the articles from the carrier, and means for transporting them transversely from the carrier while above the plane of the carrier and depositing them at another point.

23. In a side-opening-oven feeding device, the combination with an oven having a lateral opening of means for feeding cut dough, a mechanism for removing the dough from the feeding means and delivering the same transversely of the feed mechanism through the side opening into the oven.

24. In an oven-feeding device, the combination of an oven having a lateral opening, a primary carrier, delivery mechanism for lifting the dough from the carrier during the movement of the carrier, transferring the same at an angle to the carrier and depositing the dough through the opening into an oven.

25. In an oven feeding device, the combination of continuously acting feed devices for delivering material to a charge stripper, and a transversely movable charge stripper for receiving the charge and delivering it to an oven feed device, and said oven feed device.

26. The combination with an oven having a lateral opening, of a delivery mechanism for delivering cut dough adjacent to the oven, and a transversely arranged reciprocating device for transferring the cut dough from the delivery mechanism through said opening into the oven.

In testimony whereof I affix my signature in presence of two witnesses.

ALEXANDER W. COPLAND.

Witnesses:
 M. B. O'DOGHERTY,
 H. C. SMITH.